US008904287B2

(12) United States Patent
Kumar et al.

(10) Patent No.: US 8,904,287 B2
(45) Date of Patent: Dec. 2, 2014

(54) PREVIEWS OF DIALOGS IN APPLICATIONS

(75) Inventors: Divij Kumar, New Delhi (IN); Yash Kumar Gupta, Agra (IN)

(73) Assignee: Adobe Systems Incorporated, San Jose, CA (US)

( * ) Notice: Subject to any disclaimer, the term of this patent is extended or adjusted under 35 U.S.C. 154(b) by 1256 days.

(21) Appl. No.: 11/606,447

(22) Filed: Nov. 29, 2006

(65) Prior Publication Data

US 2014/0281969 A1 Sep. 18, 2014

(51) Int. Cl.
- *G06F 3/048* (2013.01)
- *G06F 3/0484* (2013.01)
- *G06F 3/0481* (2013.01)
- *G06F 3/0482* (2013.01)
- *G06F 3/0487* (2013.01)

(52) U.S. Cl.
CPC .......... *G06F 3/0482* (2013.01); *G06F 3/04847* (2013.01); *G06F 3/04812* (2013.01); *G06F 3/0481* (2013.01); *G06F 3/0487* (2013.01)
USPC ...................................................... 715/711

(58) Field of Classification Search
USPC ......... 715/711, 715, 708, 809, 810, 838, 835, 715/856, 859
See application file for complete search history.

(56) References Cited

U.S. PATENT DOCUMENTS

| | | | |
|---|---|---|---|
| 7,360,159 B2 * | 4/2008 | Chailleux | 715/709 |
| 7,424,686 B2 * | 9/2008 | Beam et al. | 715/810 |
| 7,661,070 B1 * | 2/2010 | Munter et al. | 715/781 |
| 2005/0057498 A1 * | 3/2005 | Gentle | 345/157 |
| 2005/0114778 A1 * | 5/2005 | Branson et al. | 715/711 |
| 2006/0036945 A1 * | 2/2006 | Radtke et al. | 715/708 |
| 2007/0022391 A1 * | 1/2007 | Kim et al. | 715/856 |
| 2007/0028187 A1 * | 2/2007 | Katsuyama | 715/810 |
| 2007/0033172 A1 * | 2/2007 | Williams et al. | 707/3 |
| 2007/0157119 A1 * | 7/2007 | Bishop | 715/810 |
| 2007/0180381 A1 * | 8/2007 | Rice et al. | 715/711 |

OTHER PUBLICATIONS

Opera, Opera Browser, http://www.opera.com/products/desktop/.
JPEG image, http://www.opera.com/products/desktop/screenshots/.

* cited by examiner

*Primary Examiner* — Rashawn Tillery
(74) *Attorney, Agent, or Firm* — Kilpatrick Townsend & Stockton LLP

(57) ABSTRACT

Displaying a preview image is disclosed. An indication to display a preview image is received. The indication is based at least in part on an interaction with a menu item in an application and the menu item is associated with a dialog used to provide input to the application. In response to receiving the indication, a preview image of the dialog is obtained and the preview image is displayed with the menu item.

27 Claims, 13 Drawing Sheets

PREVIEWS OF DIALOGS IN APPLICATIONS

BACKGROUND OF THE INVENTION

Applications, such as word processors and web browsers, typically include a menu bar that includes menus such as "File", "Edit", "View", etc. A user can use a mouse, touch screen, or other pointing device to open a menu by clicking on it. When the menu is open, a list of menu items for that menu is displayed. The user can then select one of the menu items, which may cause a submenu (i.e., a list of submenu items) to be displayed, a dialog to open, or an action (e.g., copy or paste) to be performed. A dialog or dialog window is a window that may be used to display information to the user and/or receive input from the user that is used by application. A dialog may open in response to selecting a menu item. Examples of dialogs include "Print", "Save", "Save As", "Options", "Preferences", etc. Often a dialog includes elements such as application settings, actions that can be performed, configuration information, etc.

FIG. 1 is an example of a graphical user interface (GUI) 100 for an application. GUI 100 includes a menu bar 102 with menus "File", "Edit", "View", "Document", and "Tools". In this example, a user has selected the "File" menu 103, which cause "File" menu items 104 to be displayed. The user has then selected the "Print" menu item 106, causing the "Print" dialog 108 to be opened. As shown, "Print" dialog 108 includes a variety of elements related to printing, including a pull down menu 112 with a list of printers and a preview 110 of a document to be printed.

Some applications, such as Adobe® Photoshop® or Adobe® Acrobat®, have a large number of menu items and dialogs. Some dialogs may include a lot of information. There may be times when a user does not know or cannot remember the dialog corresponding to a menu item. The user needs to select the menu item and open the dialog to see what is in the dialog. Sometimes when the user wants to perform some function but does not know or cannot remember which dialog is needed for the function, the user has to search through multiple menu items and dialogs, select and open multiple menu items, view multiple dialogs, and then close them (e.g., by selecting the "Cancel" button), until the desired dialog is found.

Some dialogs take time to open because data displayed in the dialog must first be obtained and transferred. For example, in "Print" dialog 108, document preview 110 may take time to generate and display. In some cases, the list of printers in pull down menu 112 may take time to obtain. Some dialogs display settings information that needs to be retrieved before being displayed. This further slows down the process.

Thus, repeatedly opening and closing dialog windows to search for a desired dialog window can be an inefficient, time consuming, and tedious process, particularly when the application has a large number of menus and menu items to search through and/or a user is unfamiliar with the application. A more user friendly way to quickly locate a desired dialog window is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
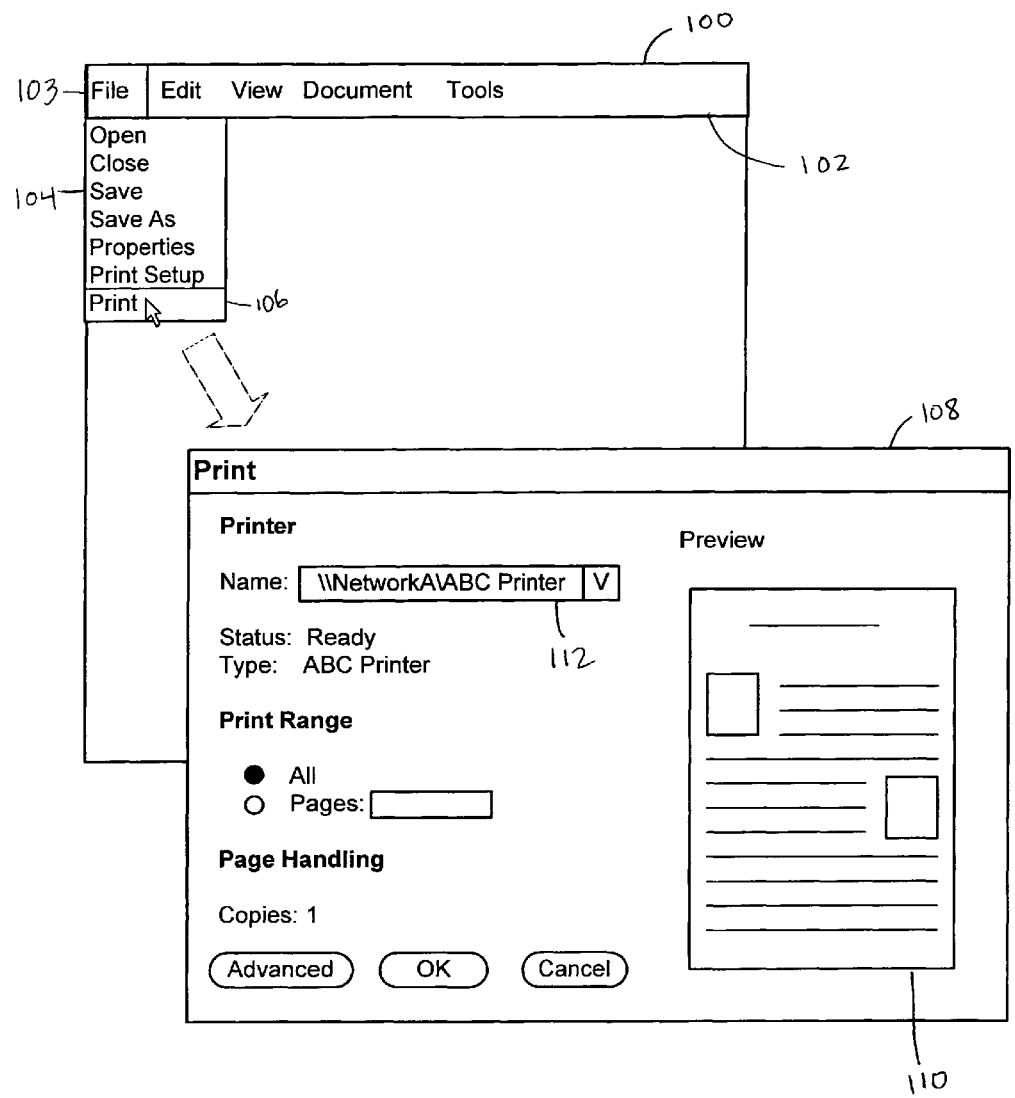
FIG. 1 is an example of a graphical user interface (GUI) 100 for an application.
Figure 2:
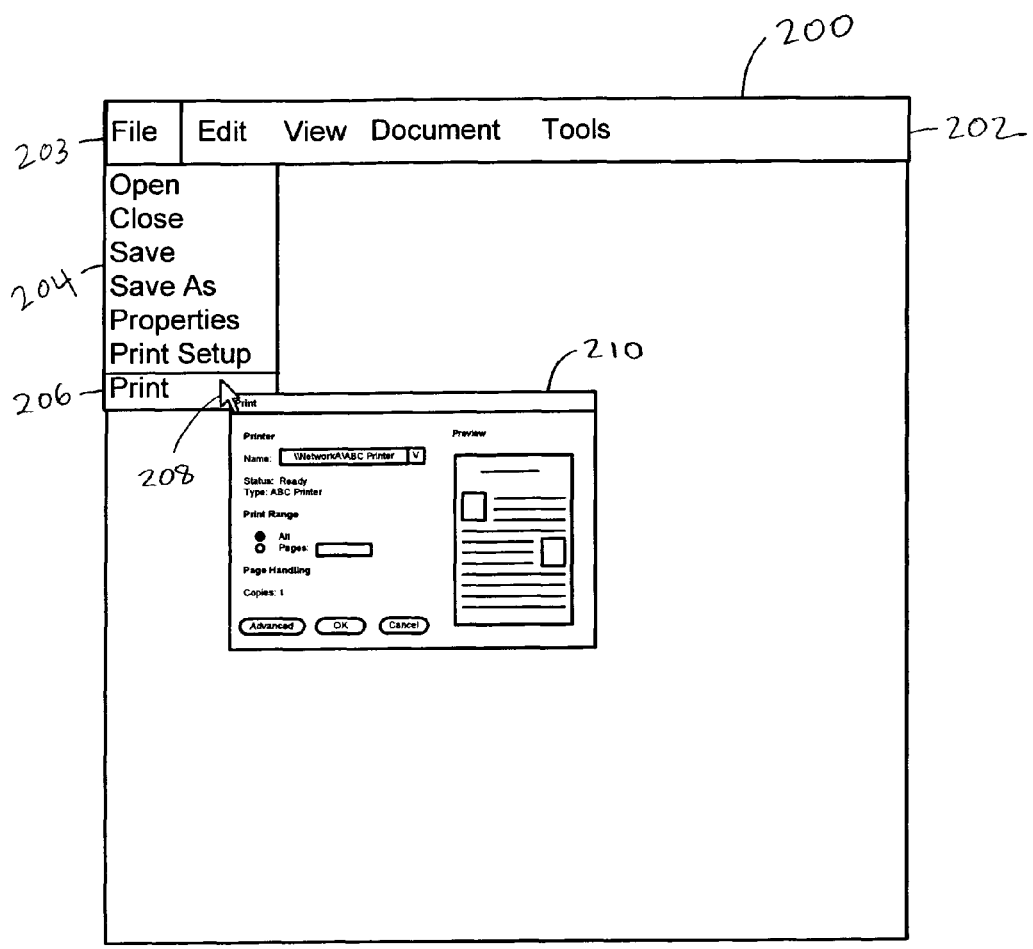
FIG. 2 is an example of a GUI for an application.

FIG. 2 is an example of a GUI for an application. The application can be any desktop application, or any web-based application, or any application that has a menu bar and/or menu items. A few examples of such applications include web browsers (such as Microsoft Internet Explorer or Mozilla Firefox), Adobe® Acrobat®, Adobe®Photoshop®, Adobe® Illustrator®, Adobe® Dreamweaver®, and word processors (such as Microsoft Word). GUI 200 includes a menu bar 202 with menus "File", "Edit", "View", "Document", and "Tools". In this example, a user has selected the "File" menu 203, which causes menu items 204 to be displayed. Using a mouse, stylus or other input device, the user hovers (e.g., without clicking) cursor 208 over "Print" menu item 206, causing preview 210 of the "Print" dialog to be displayed (i.e., as a tooltip). In this example, preview 210 (or preview image 210) is a reduced sized image (i.e., a thumbnail) of the print dialog. In some embodiments, the preview image is a low resolution version of an image of the print dialog. In some embodiments, the preview image is a small icon-like thumbnail of the print dialog which is always displayed adjacent to the print menu item. In some embodiments, the preview image is stored in a cache or memory so that it can be quickly accessed and displayed when the appropriate trigger is performed. In this example, the trigger is hovering a mouse over "Print" menu item 206. In various embodiments, the trigger may comprise a variety of actions, such as right mouse clicking over a menu item, or moving an up/down arrow key to a menu item to indicate a menu item. For example, opening the "File" menu, then hitting the down arrow key until the "Print" menu item is indicated (e.g., highlighted) may be a trigger. In various embodiments, a preview image comprises an image of a reduced sized dialog (e.g., the dialog is scaled down in size or a thumbnail), a portion of a dialog and/or a modified version of a dialog. In some embodiments, the proportion or dimensions of the preview image are not necessarily the same as the actual dialog. Various examples of preview images and displaying preview images are described with respect to the following figures. In some embodiments, the type of preview to display and the trigger that causes display of the preview is user configurable.

Figure 3:
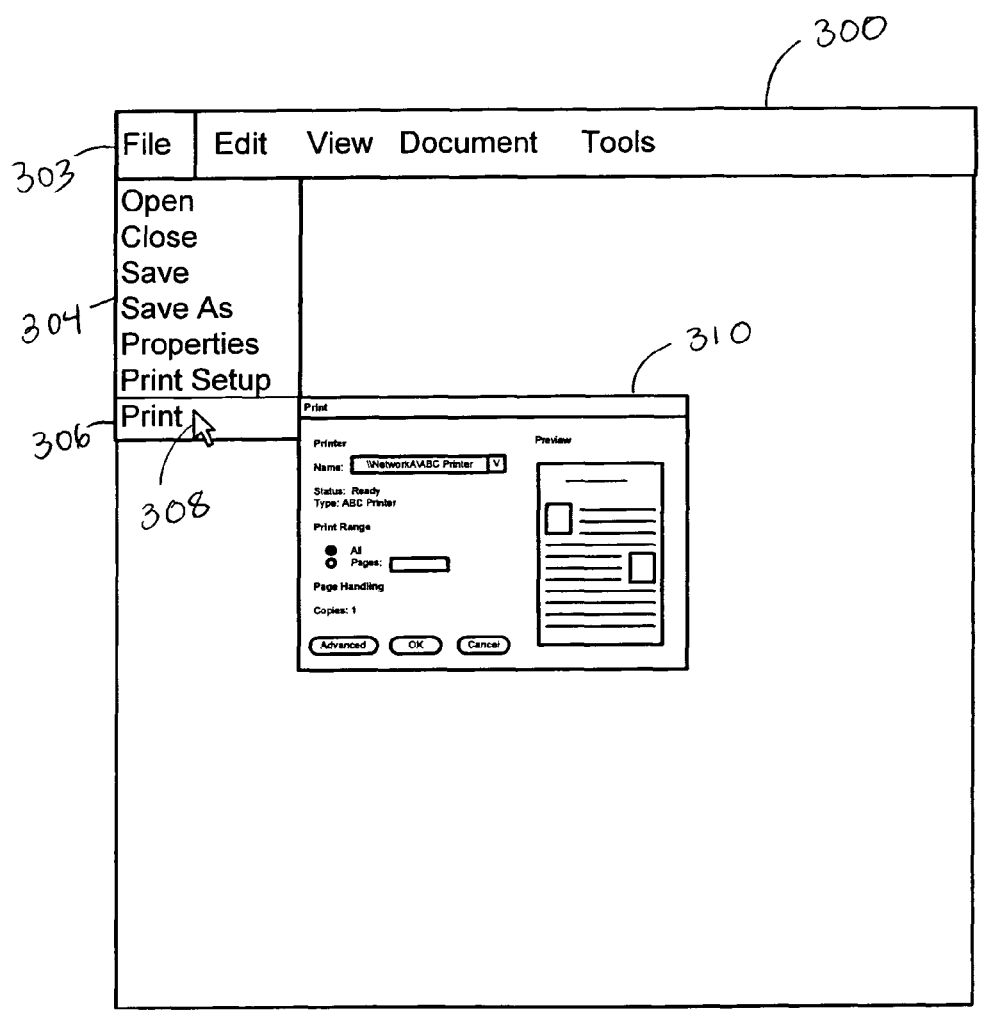
FIG. 3 is an example of a GUI for an application in which a dialog preview is displayed next to a menu item.

FIG. 3 is an example of a GUI for an application in which a dialog preview is displayed next to a menu item. In this example, a user has selected "File" menu 303 and is hovering cursor 308 over "Print" menu item 306. In response, preview 310 is displayed next to 'Print" menu item 306 (as opposed to as a tooltip as shown in FIG. 2). As shown by this example, preview 310 may be displayed in various locations on the display, such as next to or near a menu item. In some embodiments, preview 310 is always displayed next to "Print" menu item 306 when menu items 304 are displayed. In other words, opening "File" menu 303 causes menu items 304 and preview 310 to be displayed. In some embodiments, a preview is always displayed next to each menu item corresponding to a dialog. In some embodiments, the dialog previews may be arranged in such a way so as not to overlap with each other, or if they do overlap, mousing (e.g., using a mouse to manipulate a cursor) or moving a cursor over a particular preview or menu item brings it to the foreground. In some embodiments, a very small preview (nearly as big as an icon) is always displayed next to each menu item which magnifies on user trigger (hovers the mouse or uses up/down arrow key etc.), as more fully described below.

Figure 4A:
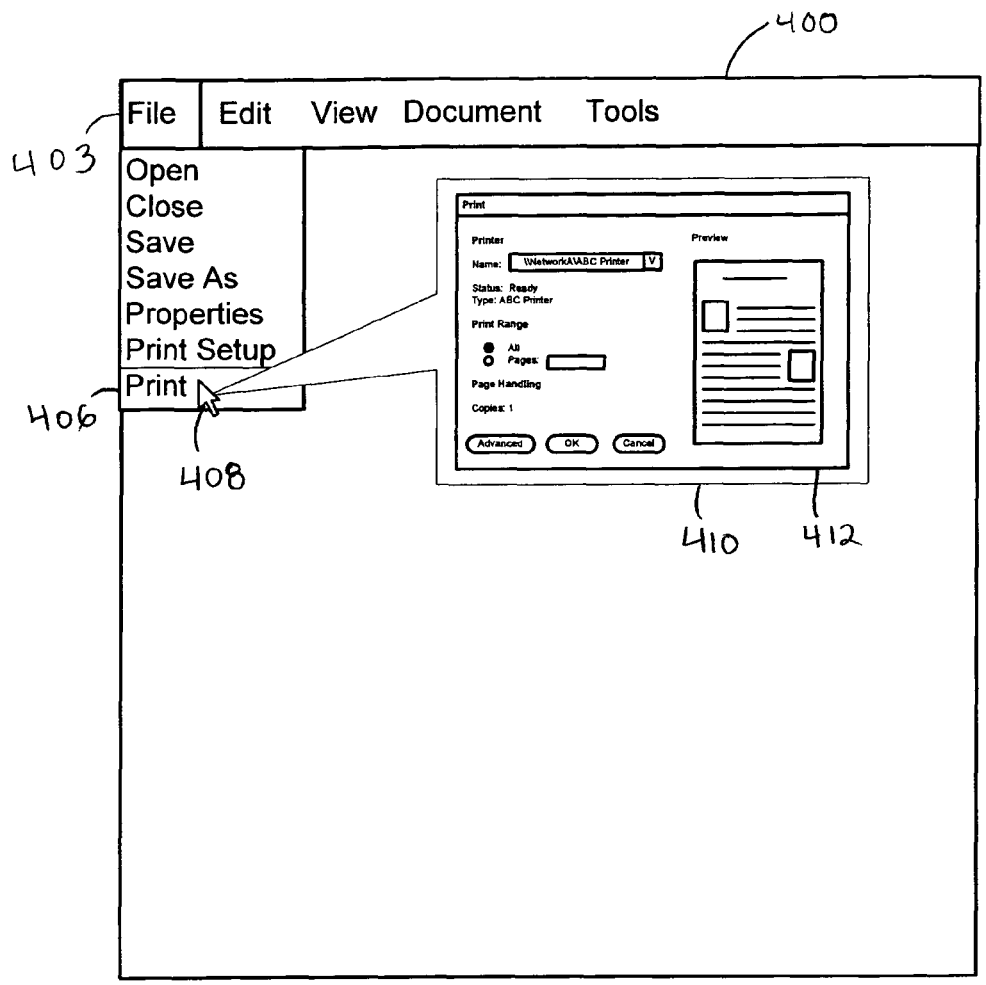
FIG. 4A is an example of a GUI for an application in which a dialog preview is displayed in a balloon graphic.

FIG. 4A is an example of a GUI for an application in which a dialog preview is displayed in a balloon graphic. In this example, a user has selected "File" menu 403 and is hovering cursor 408 over "Print" menu item 406. In response, preview 412 is displayed in a balloon graphic 410. Balloon graphic 410 is shown to extend from cursor 408 in this example. In other embodiments, balloon graphic 410 may extend from anywhere in "Print" menu item 406. As shown by this example, preview 410 may be displayed in various graphics (such as a balloon graphic) in various ways. This may be done in order to, for example, indicate to the user that this is not the actual dialog, but a preview of the dialog. Various indicators may be used to indicate that the preview is a preview. For example, the preview may be shaded gray or another color, outlined in bold, etc.

Figure 4B:
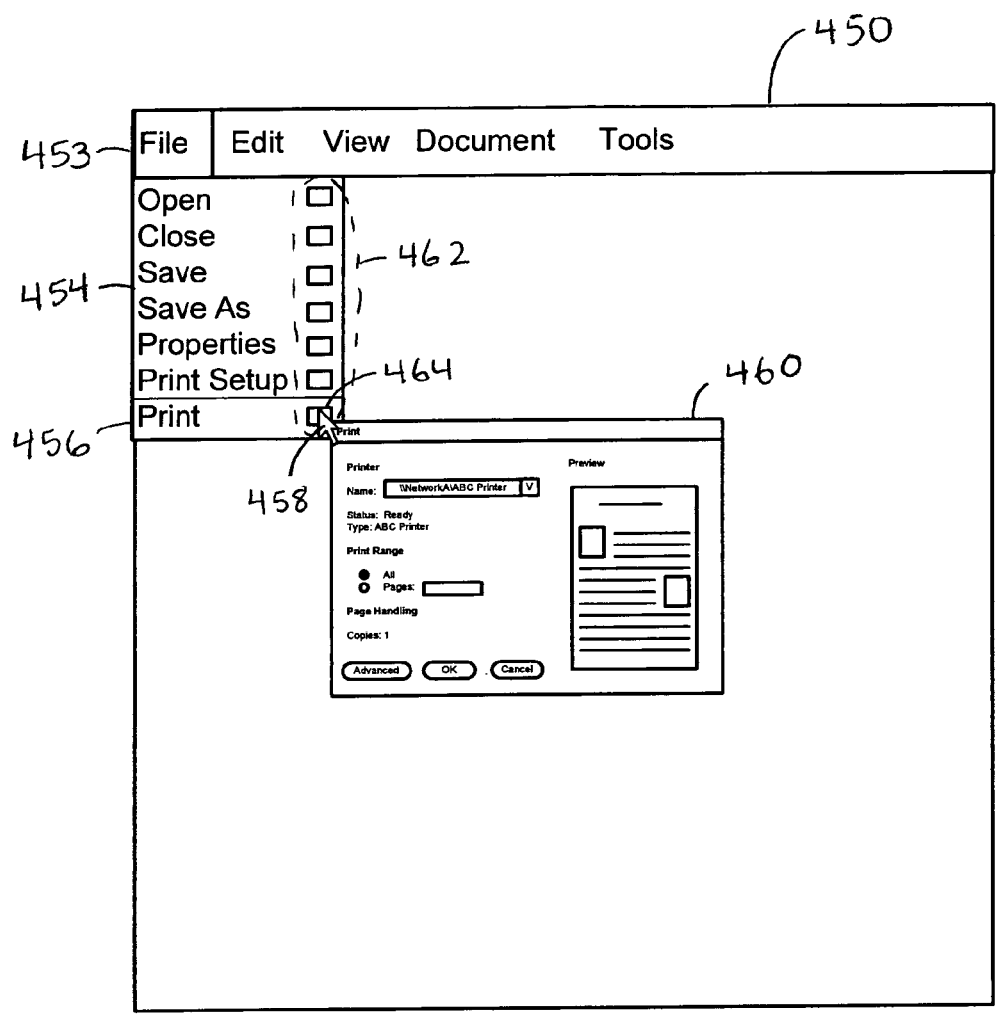
FIG. 4B is an example of a GUI for an application in which an icon of the dialog is always displayed adjacent to the menu item text.

FIG. 4B is an example of a GUI for an application in which an icon of the dialog is always displayed adjacent to the menu item text. In this example, a user has selected "File" menu 453, causing menu items 454 to be displayed. Next to each menu item is one of icons 462. In this example, the user is hovering cursor 458 over icon 464 next to "Print" menu item 456, causing preview 460 to be displayed. In some embodiments, the icon is a thumbnail (small-sized image) of the dialog. In some embodiments, the thumbnail is magnified when the user hovers the mouse over the thumbnail (or hovers the mouse over the menu item or another trigger happens) by displaying the preview instead of or in place of the icon. In this way, the icon can be considered a thumbnail sized preview and hovering the mouse over the icon causes the preview to be magnified. In addition to displaying the preview of the dialog, this also indicates to the user if there is a dialog associated with the menu item. In other words, if there isn't an icon next to the menu item, then there isn't a dialog associated with that menu item.

Figure 5:
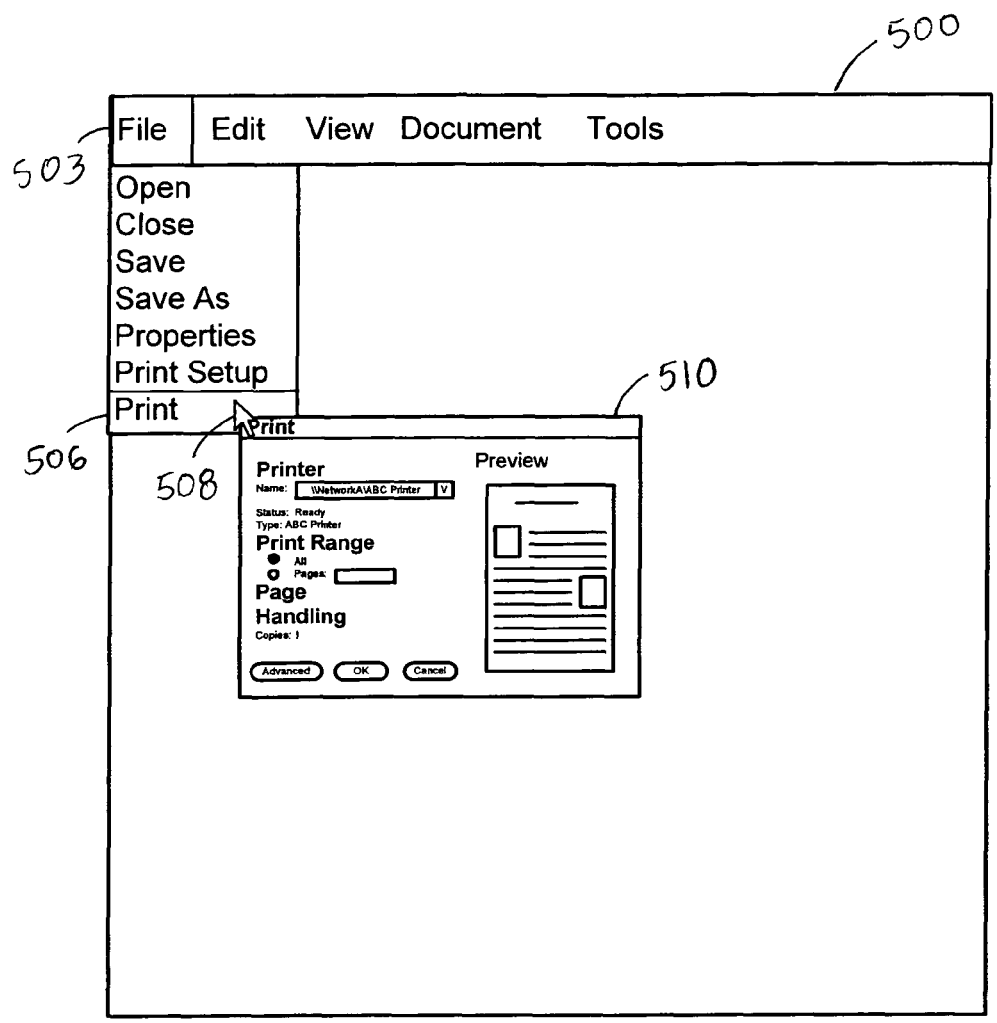
FIG. 5 is an example of a GUI for an application in which a dialog preview is an image of a modified version of a dialog.

FIG. 5 is an example of a GUI for an application in which a dialog preview is an image of a modified version of a dialog. In this example, a user has selected "File" menu 503 and is hovering cursor 508 over "Print" menu item 506. In response, preview 510 is displayed. In this example, preview 510 is an image of a modified version of the "Print" dialog. As shown, preview 510 is a reduced sized image of the "Print" dialog, with some of the text disproportionately larger in size than other text in the "Print" dialog. This way, the user can more easily read some of the text in preview 510. In some embodiments, the text that has a disproportionately larger font size corresponds to more commonly used elements in the dialog or descriptions that are representative of what the dialog can be used for (e.g., header text). As shown by this example, preview 510 may comprise an image of a modified dialog wherein at least a portion of the text is disproportionately larger relative to other text than in the actual dialog.

Figure 6:
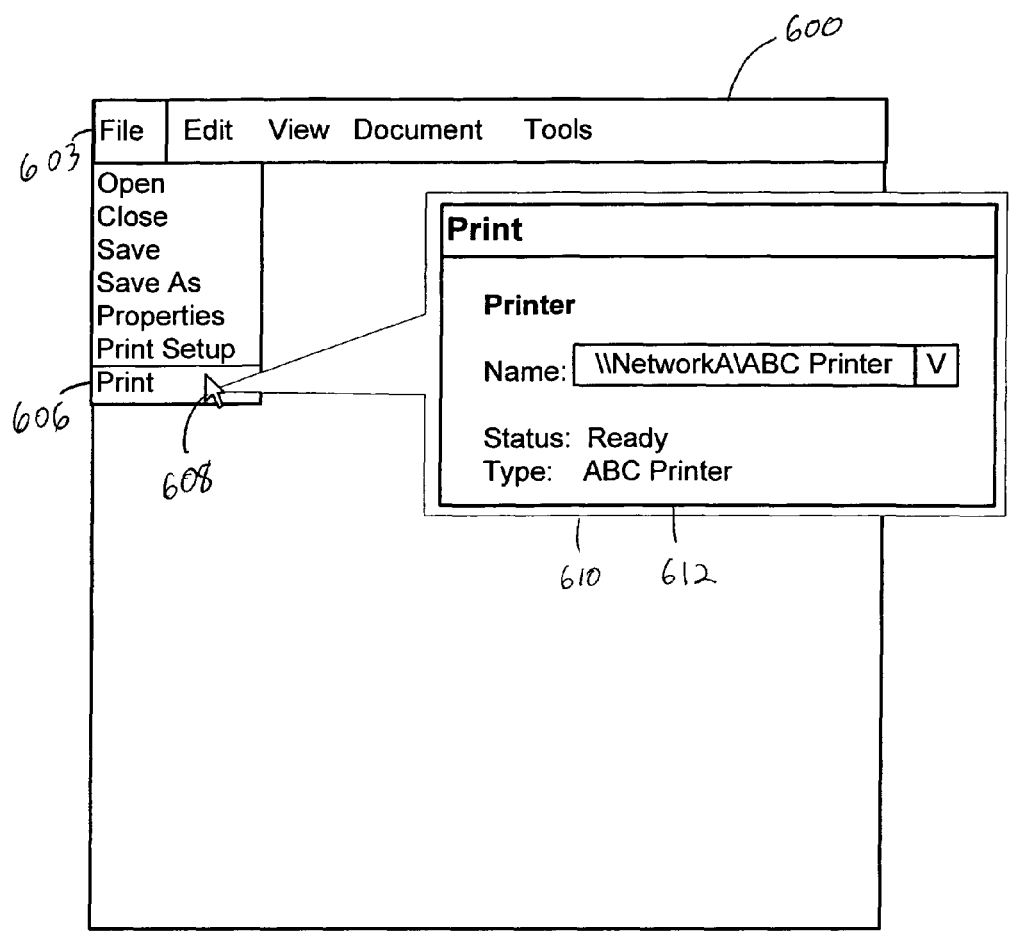
FIG. 6 is an example of a GUI for an application in which a dialog preview is an image of a portion of a dialog.

FIG. 6 is an example of a GUI for an application in which a dialog preview is an image of a portion of a dialog. In this example, a user has selected "File" menu 603 and is hovering cursor 608 over "Print" menu item 606. In response, preview 612 is displayed. In this example, preview 612 is an image of a modified version of the "Print" dialog. As shown, preview 612 is an image showing a portion of the "Print" dialog, with the portion being a representative portion of the dialog. Compared with embodiments in which the preview is a reduced size image of a print dialog, the user may be able to more easily read the text in preview 612 because the preview text is the same size as the dialog text. In some embodiments, the representative portion corresponds to more commonly used elements in the dialog or a portion that is representative of what the dialog can be used for. For example, for the "Print" dialog, only the portion of the dialog showing the printer name, status, and type are shown, which may be the most representative portions of the "Print" dialog. As shown, a preview 612 may be displayed in a balloon graphic 610, for example, to indicate that preview 612 is a preview and not the actual "Print" dialog. Showing a portion of a preview may be used in cases where it is desirable for the preview to not take up too much space on the GUI or to simplify a preview of a dialog with many elements. As shown by this example, preview 612 may comprise an image of a portion of a dialog.

In some embodiments, a user can toggle between various types of previews. For example, while a preview is being displayed, selecting a particular key or combination of keys or buttons on an input device causes various previews to be shown. For example, if preview 612 is displayed first, then selecting a particular key may cause preview 412 to be displayed. Selecting the key again may revert back to display of preview 612. In some embodiments, selecting the key again causes another type of preview to be displayed. In some embodiments, a user is able to turn off/on display of a dialog preview. For example, expert users may know where dialogs are located and may not necessarily need to view dialog previews.

Figure 7:
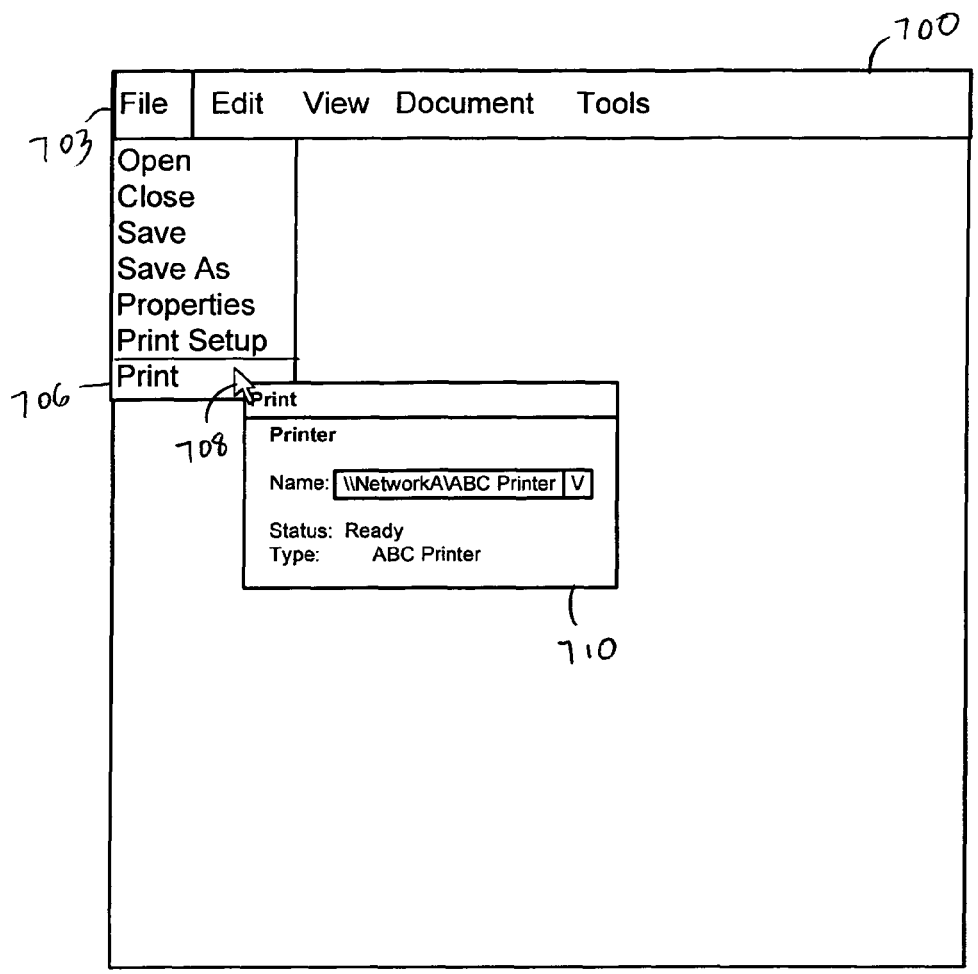
FIG. 7 is an example of a GUI for an application in which a dialog preview is a reduced size image of a portion of a dialog.

FIG. 7 is an example of a GUI for an application in which a dialog preview is a reduced size image of a portion of a dialog. In this example, a user has selected "File" menu 703 and is hovering cursor 708 over "Print" menu item 706. In response, preview 710 is displayed. In this example, preview 710 is a reduced size image of a modified version of the "Print" dialog. Compared with preview 612, preview 710 may be used in cases where it is desirable to have an even smaller preview.

Displaying a dialog preview is particularly useful when searching for dialogs that may not be easy to remember, e.g., because they have many elements in them and/or are not frequently used. For example, menu items such as "Preferences", "Options", "Advanced", may have different elements in different applications and a user may not recall which elements in a particular application are in which dialog; or a user may be unaware of which elements are in a less commonly used dialog that has many elements such as "Show Security Settings for This Document" in Adobe® Acrobat®.

Figure 8A:
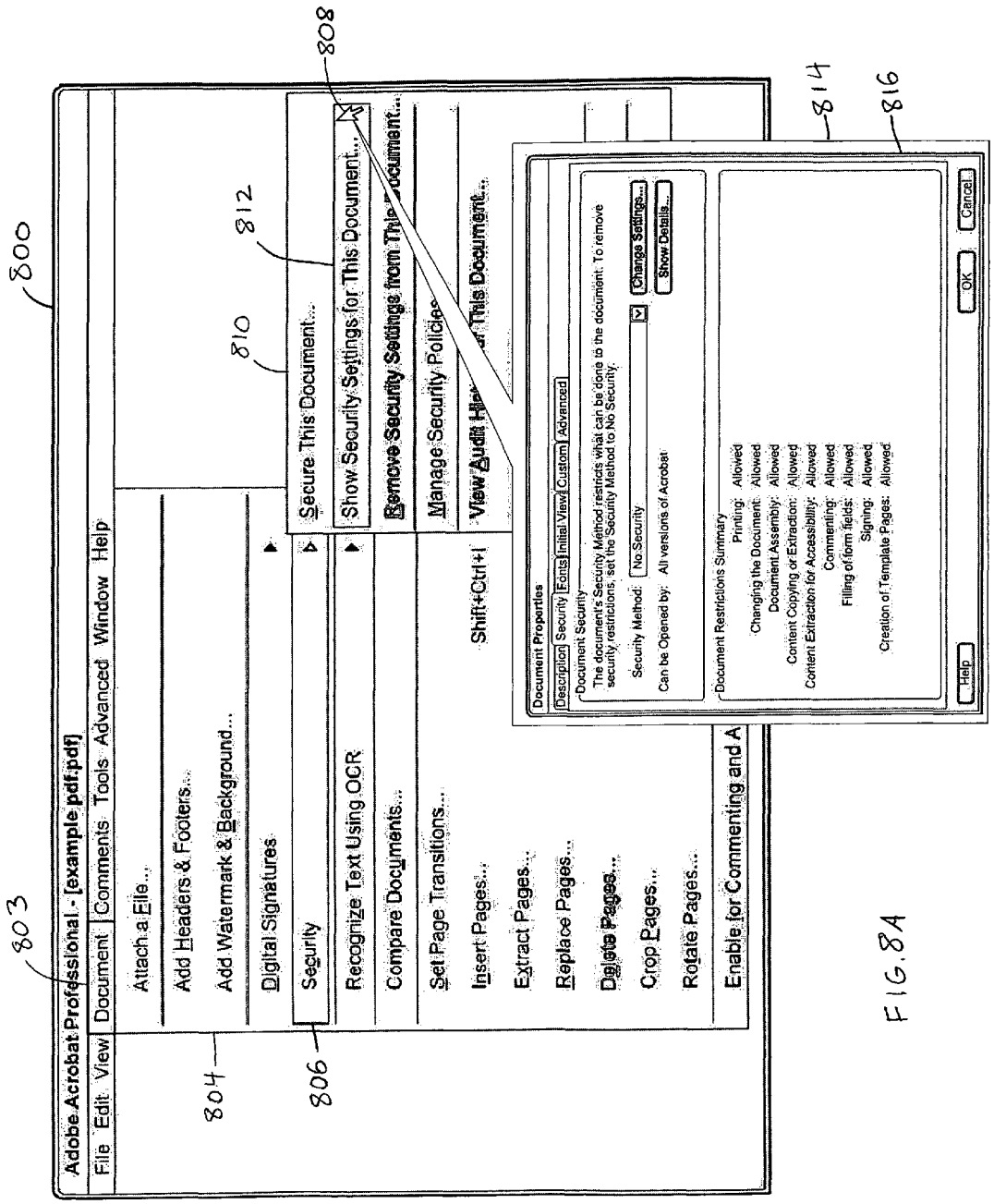
FIG. 8A is an example of a GUI for Adobe® Acrobat® in which a preview corresponding to a dialog with many elements is displayed.

FIG. 8A is an example of a GUI for Adobe® Acrobat® in which a preview corresponding to a dialog with many elements is displayed. In this example, a user has selected file menu "Document" 803, which causes menu items 804 to be displayed. The user has selected (e.g., by pressing a mouse button or selecting the down arrow key) menu item "Security" 806, which causes menu items 810 to be displayed. The user is hovering cursor 808 over "Show Security Settings for This Document . . . " menu item 812. In response, preview 816 is displayed in balloon graphic 814. In this example, preview 816 is a reduced size image of the "Show Security Settings for This Document . . . " dialog.

As can be seen from preview 816, "Show Security Settings for This Document" menu item 812 is associated with a dialog with many elements. The dialog "Document Properties" includes tabs corresponding to different pages within the dialog, one of which is associated with security settings for the document. Each page corresponds to page elements associated with that page.

Figure 8B:
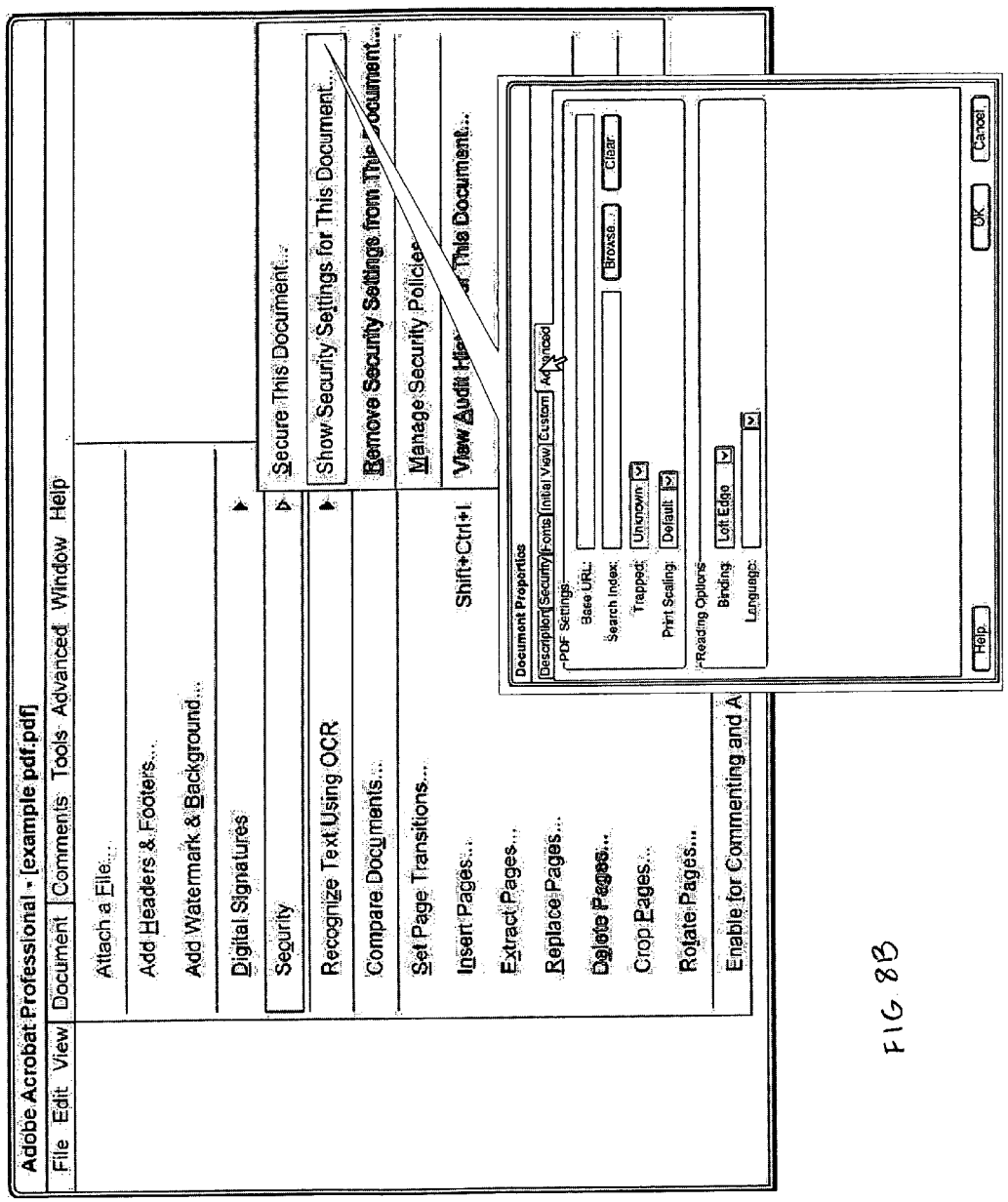
FIG. 8B is an example of a GUI for Adobe® Acrobat® in which a preview corresponding to a dialog with many elements is displayed, wherein the preview has been updated.

In some embodiments, a user can hover a cursor over an appropriate location in a preview to update the preview. For example, in preview 816 a user can hover cursor 808 over the portion of the preview corresponding to the "Advanced" tab to cause preview 816 to be updated to display the "Advanced" tab preview, as shown in FIG. 8B.

Figure 9:
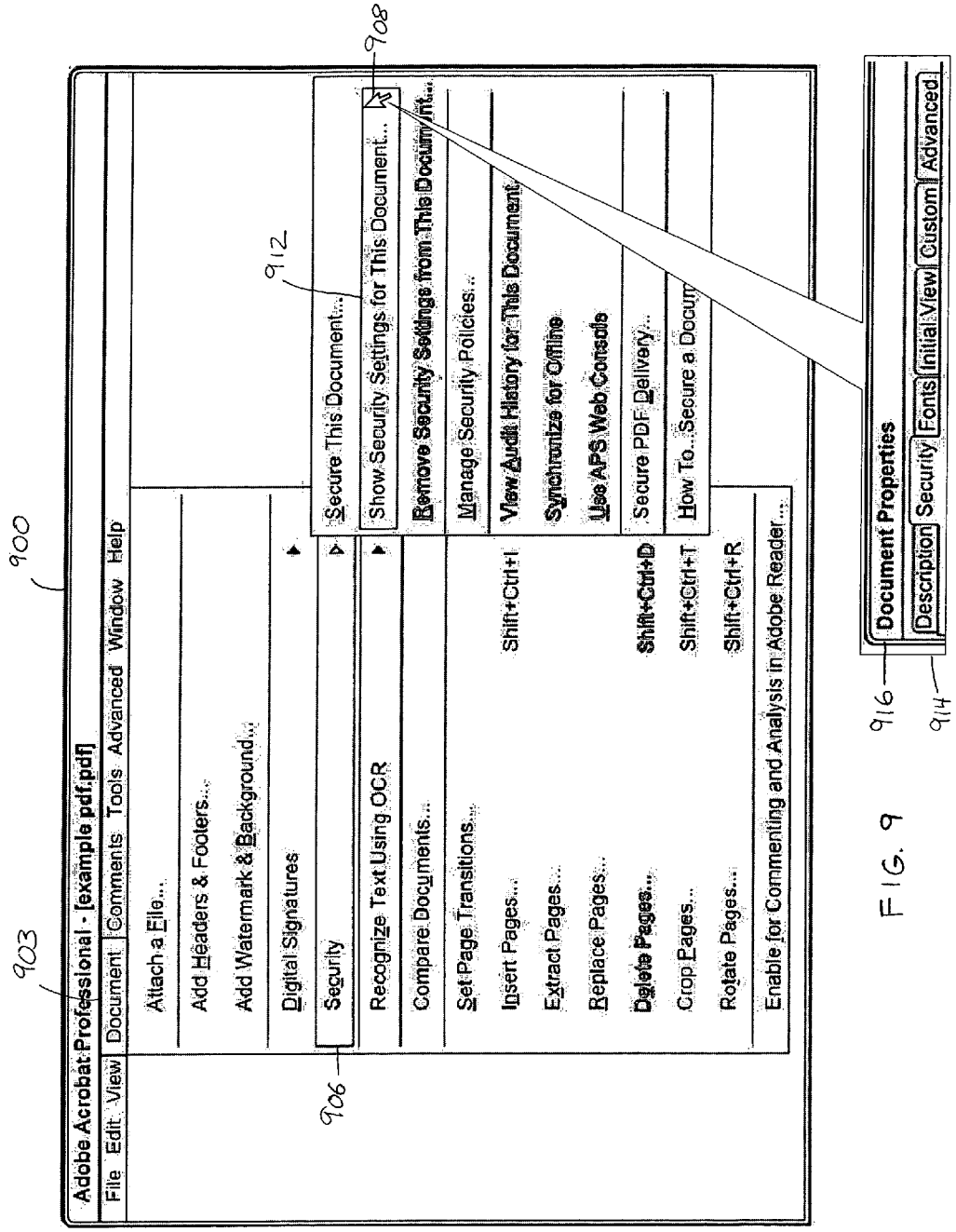
FIG. 9 is an example of a GUI for Adobe® Acrobat® in which a preview corresponding to a dialog with many elements is displayed, wherein the preview is a portion of an image of the dialog.

FIG. 9 is an example of a GUI for Adobe® Acrobat® in which a preview corresponding to a dialog with many elements is displayed, wherein the preview is a portion of an image of the dialog. In this example, a user has selected "Document" 903 and then menu item "Security" 906. The user is hovering cursor 908 over "Show Security Settings for This Document . . . " menu item 912. In response, preview 916 is displayed in balloon graphic 914. In this example, preview 916 is a portion of the "Show Security Settings for This Document . . . " dialog. The portion in this case corresponds to the tabs in the "Show Security Settings for This Document . . . " dialog. This may be a desirable preview to show in that the tabs correspond to pages with elements associated with the tab. By viewing the tab names in a preview, a user may be able to quickly get a sense of what types of elements are in the dialog.

Preview images may be static or dynamic. Static preview images remain the same each time a preview is displayed and may not necessarily reflect the current state of a dialog, document, or application. An advantage of using static preview images is that the preview images do not need to be regenerated or otherwise updated when the state of the dialog changes. The same preview image may be used each time a preview is displayed and this approach may be faster compared to the dynamic previews. In some embodiments, the preview image is of the dialog in a default state.

Dynamic preview images are preview images that may change, for example, due to a change in the current state of the dialog. For example, in the "Show Security Settings for This Document . . . " dialog, the "Security Method" may change. For example, if in FIG. 8A, preview 816 is a dynamic preview image, then the current "Security Method" is "No Security". If at some later point, the "Security Method" changes, say to "Password Security" (for example, the user may use this dialog or another dialog to cause the dialog state to change), then preview 816 is updated to show what the dialog would actually look like if it was opened; that is, the "Security Method" is set to "Password Security" instead of "No Security".

Figure 10:
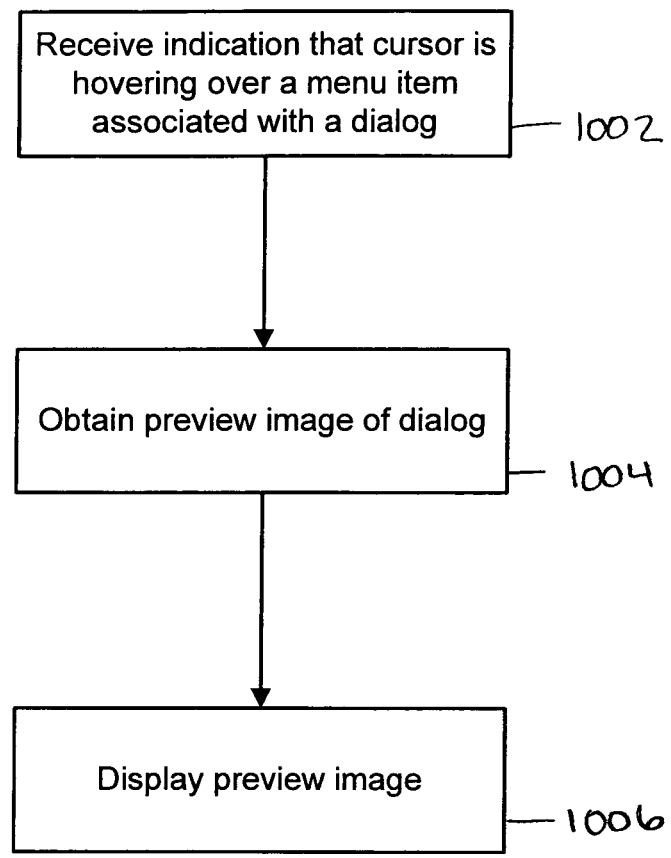
FIG. 10 is a flowchart illustrating an embodiment of a process for displaying a preview.

FIG. 10 is a flowchart illustrating an embodiment of a process for displaying a preview. At 1002, an indication that a cursor is hovering over a menu item associated with a dialog is received. In some embodiments, instead of a cursor hovering over a menu item, another indication or trigger may be received. For example, a user may use a mouse or other pointing device, or a keyboard to move a cursor over or highlight a menu item. For example, a menu item may be indicated by using up/down arrow keys to indicate (e.g., highlight) an item.

At 1004, a preview image of a dialog is obtained. In some embodiments, the preview image is retrieved from a cache or other memory in which the preview image is already stored. For example, preview images of all dialogs associated with an application may be pre-generated and stored. In some embodiments, the preview image is generated at 1004 (e.g., on the fly and/or based on the current state of the dialog, application, etc.). In some embodiments, a pre-generated preview image is retrieved from cache and modified based on user configured preview display settings. For example, if a user has configured the preview display settings such that only a portion of an image of the dialog is shown (such as preview 612, 710, or 916), then the preview image is cropped at 1004 if an image of the entire dialog is stored. In some embodiments, the stored preview image is already cropped. For example, in some embodiments, for each possible display setting, a preview image is stored. For example, for the "Print" dialog, both a thumbnail image and a cropped image may be stored. In some embodiments, preview images for all dialogs associated with an application are all pre-generated and stored. In some embodiments, preview images are generated as needed and stored once generated so that a preview image does not need to be generated twice; the second time a particular preview needs to be displayed, the stored preview image can be accessed to retrieve the preview image. In some embodiments, preview images for all dialogs are loaded at the start of the application.

At 1006, the preview image is displayed. In some embodiments, the preview image is displayed according to user configured preview display settings, such as whether to display the preview in a balloon graphic, shaded gray, or in some other color. In some embodiments, the preview image already incorporates the balloon graphic, shading, or color, as with the cropping described at 1004. As such, this process may be implemented in a variety of ways.

In some embodiments, the preview image displayed varies with characteristics of the dialog. For example, the size of the preview image may vary with the size of the dialog. A dialog with many elements and/or that is larger may have a larger preview image than a dialog with fewer elements and/or that is smaller.

Figure 11:
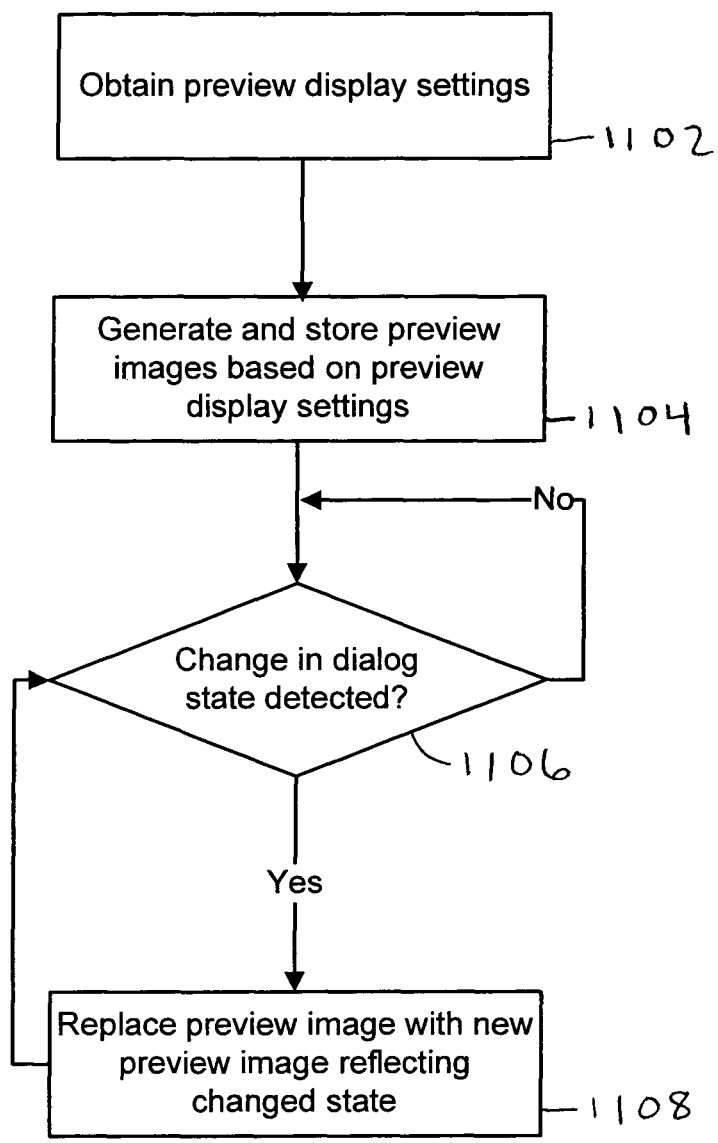
FIG. 11 is a flowchart illustrating an embodiment of a process for creating and maintaining dynamic preview images.

FIG. 11 is a flowchart illustrating an embodiment of a process for creating and maintaining dynamic preview images. In this example, a set of preview images are generated in advance and are updated if a change in dialog state is received. In some embodiments, static images are used and some other process is used for managing static images. At 1102, preview display settings are obtained. The preview display settings may be user configurable. In some embodiments, step 1102 is skipped in cases where preview display settings are not variable (e.g., not user configurable).

At 1104, preview images are generated and stored based on preview display settings. In some embodiments, preview images are generated for all dialogs associated with an application. In some embodiments, a preview image is stored with each menu item that is used to open a dialog. In some embodiments, a preview image is generated for each possible preview display setting, as described above. For example, for each menu item, two or more preview images are stored. The preview images may be stored in a variety of ways using various caching or storage techniques. For example, the preview images may be stored in a database, a table, using pointers, etc.

At 1106, it is determined whether a change in dialog state is detected. For example, in FIG. 2, if the default printer or document preview has changed, then a change in the dialog state is detected. If a change in dialog state is detected, then the preview image for the dialog is replaced with a new preview image reflecting the changed state at 1108. In some embodiments, preview images for all dialogs are loaded at the start of the application and when a dialog state changes, the corresponding preview image is loaded to replace the old preview image with a new preview image reflecting the changed state.

If at 1106, it is determined that a change in dialog state is not detected, then the process returns to 1106 at a later time. For example, 1106 may be performed periodically until a change in dialog state is detected. Alternatively, rather than performing a polling type process, an indication that a dialog state has been changed may be received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
    receiving an indication to display a dynamic preview image of a dialog window used to receive user input to provide input to an application, wherein the indication is based at least in part on an interaction with a menu item in the application and the menu item is associated with the dialog window used to receive user input to provide input to the application, wherein the dynamic preview image is based at least in part on a current dialog state based on the interaction with the menu item in the application, and wherein the dynamic preview image is interactive for providing an updated preview of the dynamic preview image; and
    in response to receiving the indication:
        obtaining the dynamic preview image of the dialog window; and
        displaying the dynamic preview image of the dialog window with the menu item.

2. A method as recited in claim 1, wherein the interaction includes hovering a cursor.

3. A method as recited in claim 1, wherein the interaction includes using one or more arrow keys.

4. A method as recited in claim 1, wherein the application is a desktop application, and wherein the menu item is accessed from a menu bar.

5. A method as recited in claim 1, wherein the application is a web-based application.

6. A method as recited in claim 1, wherein obtaining includes retrieving the dynamic preview image from storage.

7. A method as recited in claim 1, wherein obtaining includes generating the dynamic preview image.

8. A method as recited in claim 1, wherein obtaining includes retrieving the dynamic preview image from storage, wherein a preview image stored in the storage is updated with a new preview image when a state of the dialog window changes.

9. A method as recited in claim 1, further including obtaining one or more preview display settings.

10. A method as recited in claim 1, wherein the dynamic preview image is a thumbnail of the dialog window.

11. A method as recited in claim 1, wherein the dynamic preview image is an icon-size thumbnail of the dialog window, which can be magnified to a bigger thumbnail.

12. A method as recited in claim 1, wherein the dynamic preview image is of a portion of the dialog window.

13. A method as recited in claim 1, wherein the dynamic preview image is a low resolution version of an image of the dialog window.

14. A method as recited in claim 1, wherein the dynamic preview image is of a modified version of the dialog window.

15. A method as recited in claim 1, wherein displaying includes displaying the dynamic preview image as a tooltip.

16. A method as recited in claim 1, wherein displaying includes displaying the dynamic preview image next to the menu item.

17. A method as recited in claim 1, wherein displaying includes displaying the dynamic preview image next to the menu item as an icon and magnifying it.

18. A method as recited in claim 1, wherein the dynamic preview image is of a scaled down version of the dialog window and wherein at least some text of the dynamic preview image of the dialog is not scaled down to a same degree.

19. A method as recited in claim 1, wherein the size of the dynamic preview image varies with the size of the dialog window.

20. A method as recited in claim 1, wherein displaying includes visually indicating the dynamic preview image is a preview.

21. A method as recited in claim 1, wherein displaying includes visually indicating the dynamic preview image is a preview using a balloon.

22. A method as recited in claim 1, wherein displaying includes visually indicating the dynamic preview image is a preview using color and/or shading.

23. A method as recited in claim 1, wherein the dialog window includes one or more tabs and the dynamic preview image is of a portion of the dialog window that includes the one or more tabs.

24. A system, including:
   a processor; and
   a memory coupled with the processor, wherein the memory is configured to provide the processor with instructions which when executed cause the processor to:
   receive an indication to display a dynamic preview image of a dialog window used to receive user input to provide input to an application, wherein the indication is based at least in part on an interaction with a menu item in the application and the menu item is associated with the dialog window used to receive user input to provide input to the application, wherein the dynamic preview image is based at least in part on a current dialog state based on the interaction with the menu item in the application, and wherein the dynamic preview image is interactive for providing an updated preview of the dynamic preview image; and
   in response to receiving the indication:
      obtain the dynamic preview image of the dialog window; and
      display the dynamic preview image of the dialog window with the menu item.

25. A system as recited in claim 24, wherein the application is a desktop application, and wherein the menu item is accessed from a menu bar.

26. A computer program product, the computer program product being embodied in a computer readable medium and comprising computer instructions for:
   receiving an indication to display a dynamic preview image of a dialog window used to receive user input to provide input to an application, wherein the indication is based at least in part on an interaction with a menu item in the application and the menu item is associated with the dialog window used to receive user input to provide input to the application, wherein the dynamic preview image is based at least in part on a current dialog state based on the interaction with the menu item in the application, and wherein the dynamic preview image is interactive for providing an updated preview of the dynamic preview image; and
   in response to receiving the indication:
      obtaining the dynamic preview image of the dialog window; and
      displaying the dynamic preview image of the dialog window with the menu item.

27. A computer program product as recited in claim 26, wherein the application is a desktop application, and wherein the menu item is accessed from a menu bar.

* * * * *